Figure 1:
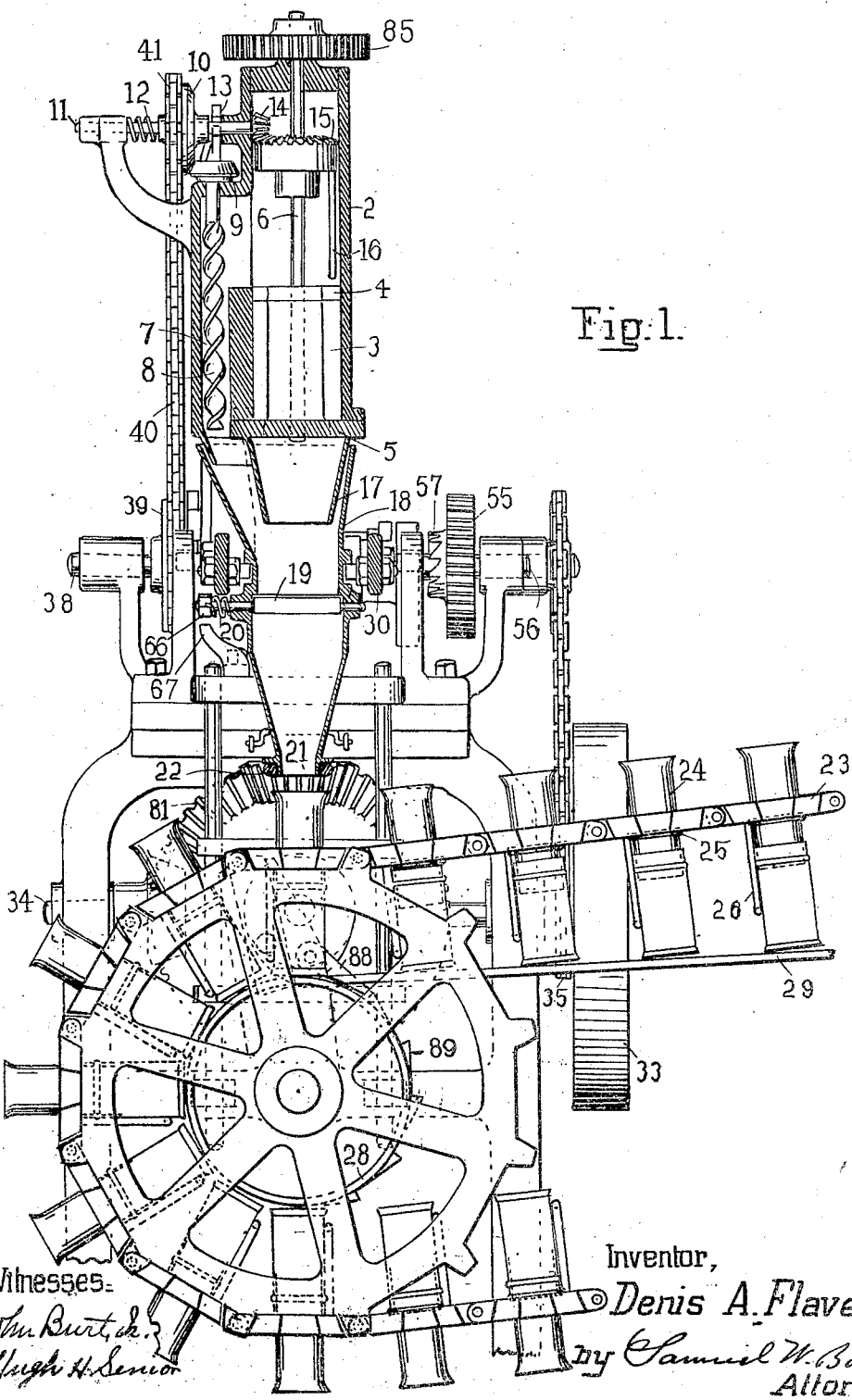

D. A. FLAVELL.
AUTOMATIC WEIGHING MACHINE.
APPLICATION FILED SEPT. 25, 1907.

902,485.

Patented Oct. 27, 1908.
5 SHEETS—SHEET 1.

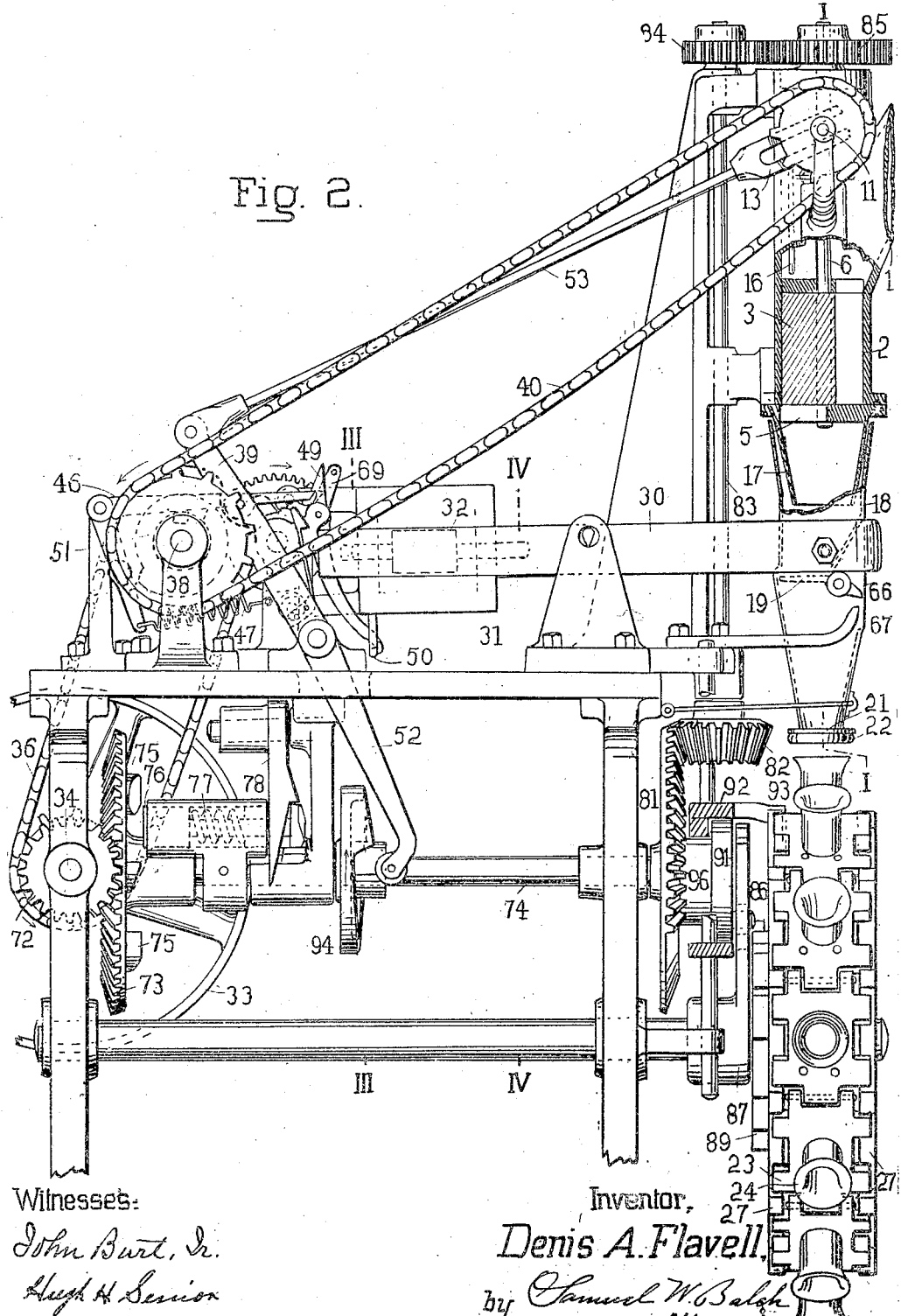

D. A. FLAVELL.
AUTOMATIC WEIGHING MACHINE.
APPLICATION FILED SEPT. 25, 1907.
902,485.
Patented Oct. 27, 1908.
5 SHEETS—SHEET 3.
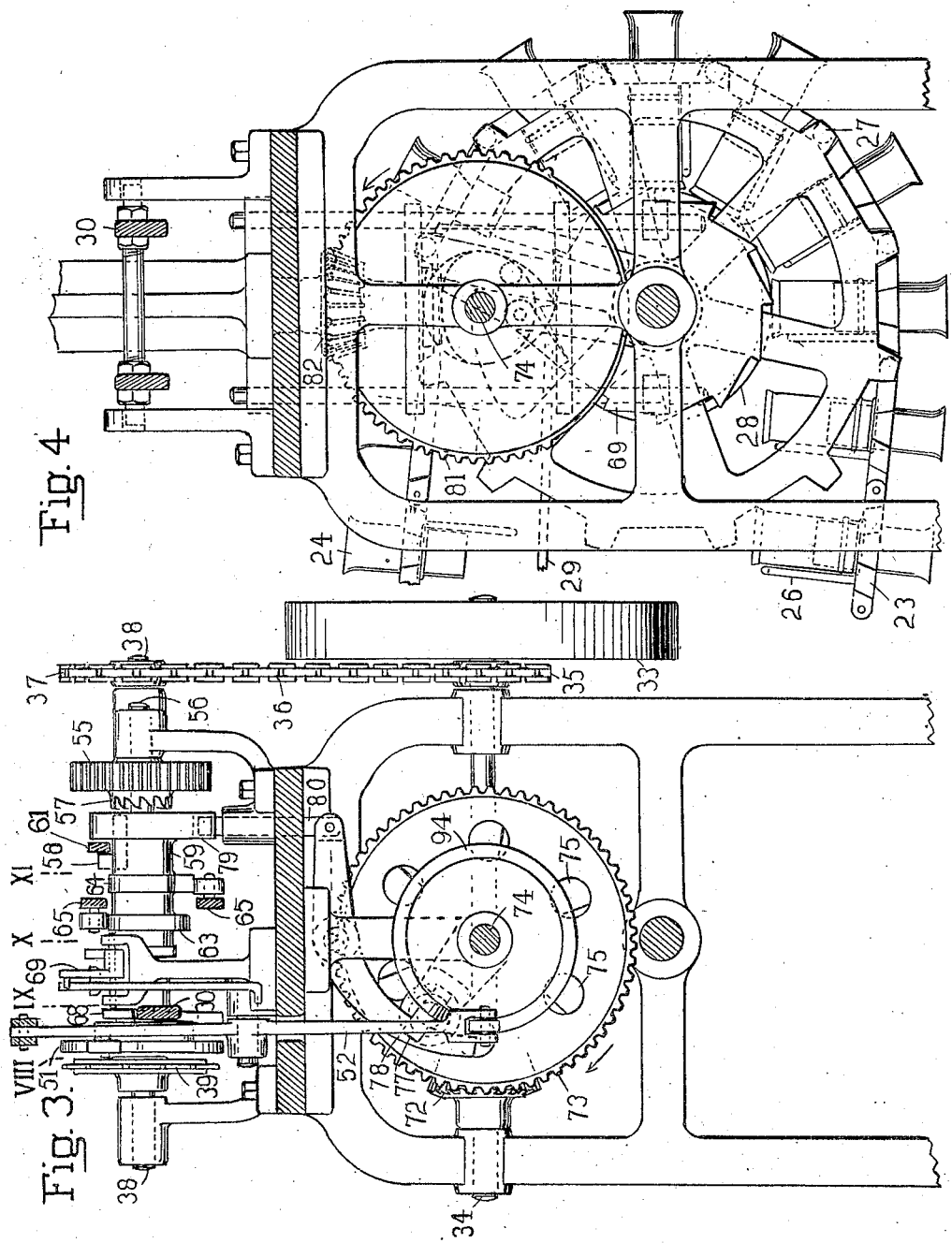
Witnesses
John Burt Jr.
Hugh H. Senior
Inventor,
Denis A. Flavell,
by Samuel W. Balch
Attorney

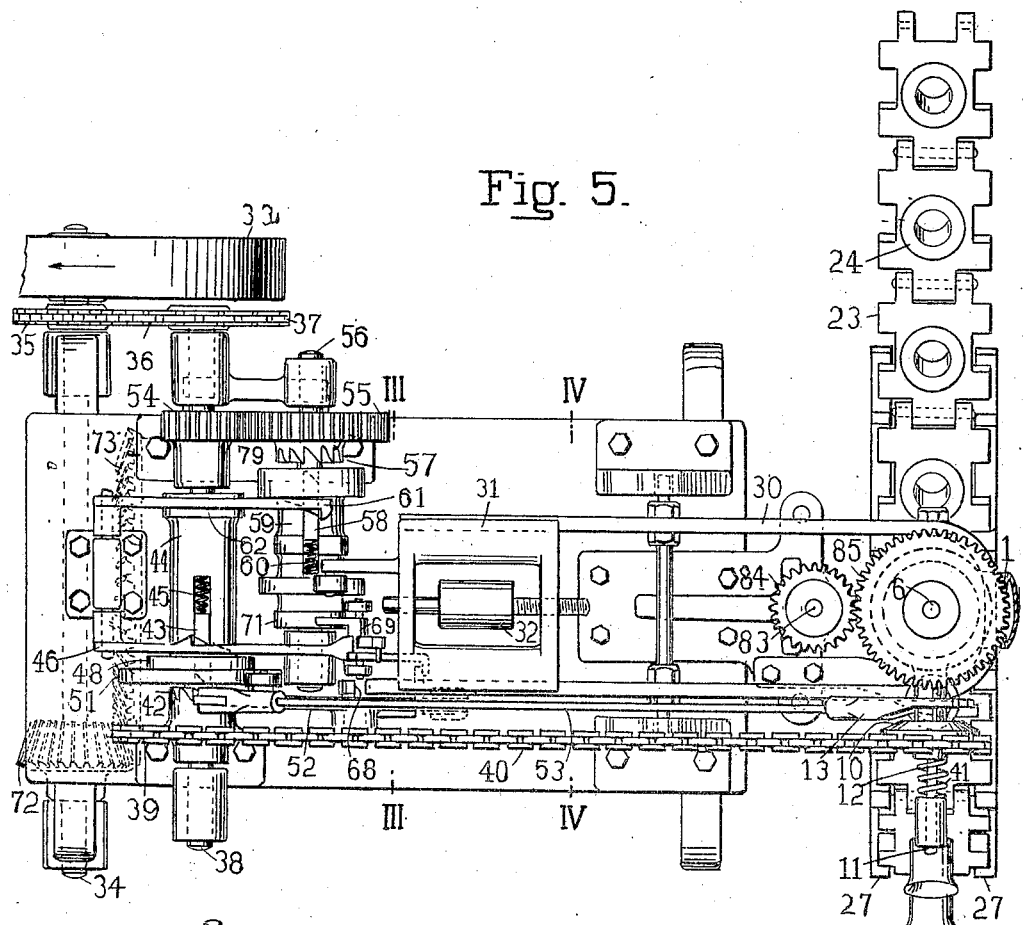

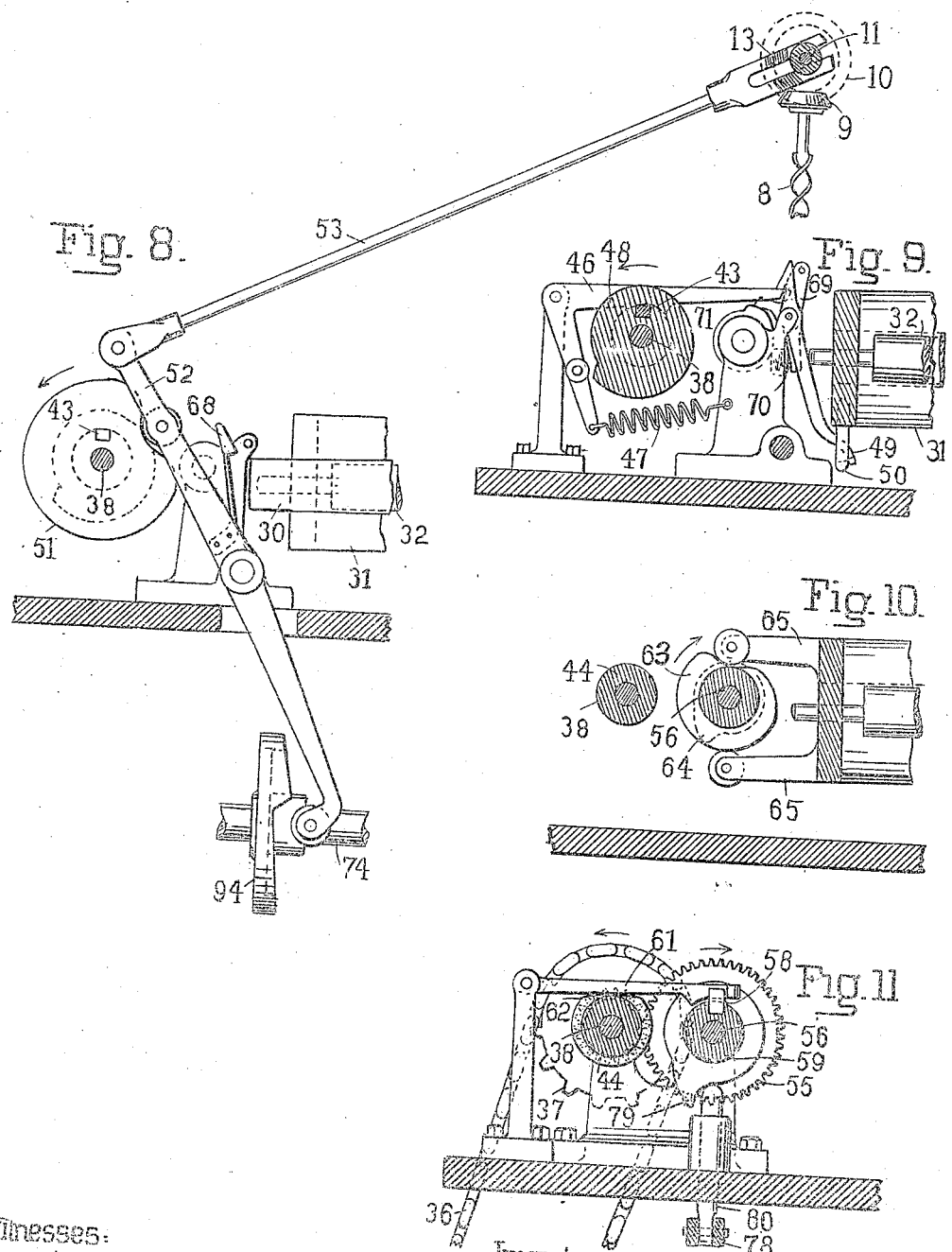

UNITED STATES PATENT OFFICE.

DENIS A. FLAVELL, OF JERSEY CITY, NEW JERSEY.

AUTOMATIC WEIGHING-MACHINE.

No. 902,485.

Specification of Letters Patent.

Patented Oct. 27, 1908.

Application filed September 25, 1907. Serial No. 394,450.

*To all whom it may concern:*

Be it known that I, DENIS A. FLAVELL, a citizen of the United States of America, and a resident of Jersey City, in the county of Hudson and State of New Jersey, have invented certain new and useful Improvements in Automatic Weighing-Machines, of which the following is a specification.

The object of this invention is to provide an automatic machine for weighing and depositing in cans given quantities of powdered or granular materials, and particularly for operating on materials which are liable to cake, which are of a dusty nature and which have a tendency to trap air and yield it slowly so that they compact gradually.

Further objects of the invention are to provide a weighing and filling-machine which will operate on such materials without permitting an appreciable escape of dust therefrom, and to effect the weighing and filling with speed and accuracy, and with regularity and certainty of operation into cans of suitable capacity to contain such materials of the required weight at their normal volume.

In the accompanying five sheets of drawings which form a part of this application—Figure 1 is a front elevation of an automatic weighing-machine embodying my invention, the filling-head being in section on the line I—I of Fig. 2. Fig. 2 is a side elevation with the filling-head broken away. Fig. 3 is a section on the line III—III of Figs. 2 and 5 looking rearwardly. Fig. 4 is a section on the line IV—IV of Figs. 2 and 5 looking forward. Fig. 5 is a plan view. Fig. 6 is a perspective view showing the measuring-chamber of the filling-head broken away. Fig. 7 is a detail of the feed and latching-mechanism for the chain conveyer for cans. Fig. 8 is a section on the line VIII of Fig. 3 showing the power-driven means for opening and closing the clutch for operating the drip-stream conveyer. Fig. 9 is a section on the line IX of Fig. 3 showing the trigger-mechanism for closing and the cam for opening the clutch which operates the cam which opens the drip-stream conveyer clutch. Fig. 10 is a section on the line X of Fig. 3 showing the cams for positive movements of the weighing-mechanism. Fig. 11 is a section on the line XI of Fig. 3 showing the cams and clutch for operating the clutch for the cams of Figs. 9 and 10 and showing the cam for operating the mechanism for the measuring-chamber and chain conveyer for cans.

The machine as illustrated is designed to receive through a tubular chute 1 from an overhead bin or hopper such materials as baking-powder, and is constructed four times the scale of the original drawings to weigh the baking-powder into four-ounce quantities and fill into cans. The material is delivered from the chute into the upper part of the side of an inclosed vertically bored filling-head 2, in the lower portion of which is a chambered or notched cylindrical block 3 forming a measuring-chamber with the filling-head.

The measuring-chamber is partitioned off by an upper diaphragm 4 with an inlet port on one side of the axis and a lower diaphragm 5 with an outlet port unalined and on the opposite side of the axis. On rotation of the block, the chamber formed by the notch is brought alternately opposite the inlet and the outlet ports so as to receive and discharge a measured volume of material with each rotation which is as near to and yet always under the required amount by weight as is found practicable. The chambered block is attached to a shaft 6 which projects through the top of the filling-head. The filling-head is provided with a by-pass 7 to the measuring-chamber in which is a screw conveyer 8 by which a drip-stream is discharged from the filling-head. A friction-bevel 9 on the upper end of the conveyer-stem receives motion from a friction-bevel 10 when the two are in contact. The driving friction-bevel is mounted on a horizontal shaft 11 which is kept continuously running. A spring 12 around this shaft presses the friction-bevels into contact and a forked wedge 13 serves to separate the bevels. The separatable bevels with the closing-spring and separating-wedge constitute a clutch in the power transmission to the drip-stream conveyer. The continuously running horizontal shaft enters the filling-head and a toothed bevel pinion 14 thereon engages a bevel gear 15, the latter running loosely on and independently of the shaft for rotating the chambered-block. Depending from the periphery of the gear is a rod 16 which serves as a stirrer to break up any lumps in the material and insure its supply particularly to the drip-stream conveyer in a finely comminuted condition. On the lower end of the filling-head below the measuring-chamber and drip-stream conveyer is formed a conical nozzle 17 which fits as closely as may be without interfering with the weighing into the flaring mouth of a weighing-bucket 18. The bucket is provided with a discharge-valve 19 which is held closed by a spring 20, and the bucket has a discharge-opening 21 below the valve. A rubber gasket 22 is provided at the opening.

Below the discharge opening of the bucket is an endless-chain conveyer for cans consisting of perforated plate links 23 with filling-tubes 24 passing through the perforations in each link. Engaging spaces for sprocket teeth are formed along the edges of the chain on both sides of the line of filling-tubes. Other notches or spaces save weight and are engaged by means described later for securing accurate registry of the filling-tubes with the discharge-opening of the bucket. Rubber gaskets 25 25 surround the filling tubes on the inclosing side of the chain. A wire loop 26 fastened to each link serves to retain the can on the filling tube while passing around the sprocket and to carry it along with the chain on the upper run. Under the weighing-bucket is a pair of sprockets 27 27 around which the conveyer-chain passes and between the sprockets is a pulley 28. The cans are placed mouth downward on the lower branch of the conveyer chain and when the cans are passing around the pulley and sprockets the bottoms bear against the pulley and the mouths are pressed against the gaskets, thereby hermetically sealing the cans to the links and filling-tubes. When carried off from the pulley with the upper branch of the chain conveyer the can-bottoms rest on a guide and support 29 which diverges from the line of the conveyer-chain so that the filling-tubes are gradually withdrawn.

The weighing-bucket is mounted on a balance-beam 30 formed of a bar bent around the bucket and the ends brought parallel. A balance-weight 31 carries a smaller screw-mounted weight 32 for close adjustment.

The machine is power driven through a belt-pulley 33 on a shaft 34. A sprocket-wheel 35, chain-belt 36 and sprocket-wheel 37 transmit the power to a shaft 38. A sprocket-wheel 39 on this shaft, chain-belt 40 and sprocket-wheel 41 continues the power transmission to the horizontal shaft on the filling-head through which the drip-stream conveyer and stirrer are operated. The shaft 38 also carries a toothed clutch-member 42 which is engaged by a bolt 43 carried by a cam-sleeve 44. This bolt is automatically operated by a spring 45 and is retracted by a clutch-finger 46. The finger is retracted by a spring 47. The cam-sleeve carries a cam 48 which acts on a prong of the clutch-finger to return it to engaging position in time to reëngage the clutch at the completion of a revolution. Hence the clutch is automatically closing and self-opening. The clutch-finger is retained in engaging position by a trigger 49 which is held in engagement by a projection 50 from the balance-weight of the weighing-mechanism, and is released thereby when the required weight is reached. Also on the cam-sleeve driven through this clutch is a cam 51 which, on operation, acts on a lever 52 and through a rod 53 operates the wedge of the clutch in the power transmission to the drip-stream conveyer, thereby cutting off the drip-stream. The several parts of this power-driven means for opening the drip-stream clutch are made as quick acting as practicable in order that the drip-stream may be cut off promptly upon action of the weighing-mechanism.

Small and large gears 54 and 55 transmit power from the shaft 38 to a shaft 56 and drive it at a slower speed. This shaft carries a toothed clutch-member 57 which is engaged by a bolt 58 carried by a cam-sleeve 59. The bolt is automatically operated by a spring 60 and is retracted by a finger 61 at the end of each revolution. This finger is conveniently tripped by a cam 62 on the other cam-sleeve 44 to close the clutch. Cams 63 and 64 act on projections 65 which are conveniently carried by the balance-weight of the weighing-mechanism and effect a positive movement of the weighing-mechanism—first, lifting the weighted end of the balance-beam and forcing down the bucket, thereby bringing an operating lever 66 of the discharge-valve of the bucket into engagement with a projection 67 from the framework of the machine and, at the same time, closing the discharge-mouth of the bucket against the top of the underlying filling-tube. As the gasket around the filling-tube is closed against the mouth of a can, hermetical connection is thereby effected between the bucket and the can. While the weighing-mechanism would ordinarily lift the bucket clear of the filling-tube after the discharge of the load, the cams are, second, for safety, arranged to make this movement positive. When the cam movement is completed, the cams lie clear of the weighing-mechanism and leave it free to act so far as these cams are concerned, but a latch 68 is provided which engages the balance-beam of the weighing-mechanism on its return and prevents premature action. A rocker 69 pressed by a spring 70 rests against and resets the trigger and holds it in position to reëngage the clutch-finger 46 and to be reëngaged by the weighing-mechanism. A cam 71 on the cam-sleeve lifts the rocker from the trigger as the cam-sleeve 59 completes its movement, thereby leaving the trigger again free to release the clutch-finger which it controls when it is again released by the weighing-mechanism. During all of the foregoing movements the chambered block in the filling-head is resting at the filling position.

A bevel pinion 72 on the shaft with the driving-pulley continuously drives a bevel gear 73 which runs loose on a shaft 74. This wheel has clutch-pins 75 75 which are engaged by a bolt 76 carried by an arm pinned to the shaft. The bolt is automatically operated by a spring 77 and is retracted at the end of a revolution by a clutch-finger 78. This finger is tripped by a cam 79 on the cam-sleeve 59 acting through a connecting-rod 80. The shaft thus clutched transmits power through the bevel gear 81, pinion 82, vertical shaft 83, and gears 84 and 85, to the shaft in the filling-head and effects one revolution of the chambered block. The bevel gear is mutilated so that there will be a period of rest at the middle point of the revolution of the chambered block while it is at the discharge point in order to give time for the material to empty therefrom.

A crank 86 at the end of the shaft 74 operates an arm 87 which carries a pawl 88 engaging with a ratchet 89 which is attached to the sprocket-wheels for feeding the chain conveyer for the cans. Cams 90 and 91, also on the shaft 74, engage a vertically sliding frame 92 with a bolt 93 which enters notches in the links of the chain conveyer and insures accurate registry. A cam 94 also carried by the shaft 74 engages and returns the lever 52 after the discharge of the measured quantity into the weighing-bucket and thereby again starts the drip-stream conveyer to make up the required weight. At the same time the latch 68 is retracted and the weighing-mechanism thereby freed for operation of the trigger and repetition of operations from the beginning as above described.

The machine is illustrated in all the figures in the position with the drip-stream conveyer running to complete a load and the other parts directly concerned with the material at rest with the exception of the stirrer which runs continuously. The operations following this position will now be traced. On the load being made up, tilting of the balance-beam releases the trigger 49 and this in turn releases the clutch-finger 46, closing the clutch to the fast-running cam-sleeve. A cam on this sleeve operates the clutch which stops the drip-stream conveyer, and another cam on the same sleeve starts the slow-running cam-sleeve. This second cam-sleeve first forces the discharge opening of the bucket into contact with a filling-tube and opens the discharge-valve. It then returns the bucket to its upper position and latches the weighing-mechanism. The cam-sleeve also resets the trigger and starts the mechanism which feeds the chain conveyer for the cans and deposits a measured charge in the bucket. This last mechanism at the conclusion of its movement starts the drip-stream conveyer and unlatches the weighing-mechanism. The operations then repeat as above traced.

In depositing baking-powder in free air dust rises therefrom to a height of about six inches and gradually settles. In order to keep the air surrounding the machine free from dust, the deposit from one chamber to another is made between parts which are as closely coupled as possible so that the air displaced from the chamber into which the material falls and which naturally carries the dust will be substantially drawn into the cavity from which the material falls, and such venting as may be necessary will be at a point above that to which the dust will rise. The filling-head is substantially sealed and each measure of material taken therefrom through the measuring-chamber involves a discharge of the displaced air into the filling-head, where it is more or less retained and compressed except as it may gradually filter up through the chute. This air serves to lighten the material and enables the stirrer to more thoroughly break up lumps which would interfere with accurate weighing. After deposition into the filling tubes and cans the air is given time to work out and the material time to settle during the gradual withdrawal of the filling-tubes from the cans. Hence somewhat smaller cans are permissible.

What I claim as new and desire to secure by Letters Patent of the United States is—

1. The combination with a weighing-mechanism, of an inclosed filling-head, means for discharging a measured quantity of material from the filling-head, means for positively charging a measured quantity of air into the filling-head, a stirrer within the filling-head, and means for operating the stirrer.

2. The combination with a weighing-mechanism of an inclosed filling-head with fixed diaphragms having unalined inlet and outlet ports, a stirrer within the filling-head, means for operating the stirrer, a chambered block forming a measuring-chamber with an inlet and outlet the bounding lips of which contact with the diaphragms, and means for rotating the chambered block so as to bring the measuring-chamber alternately into communication with the inlet and outlet ports.

3. The combination with a weighing-mechanism, of a vertical cylindrically bored and inclosed filling-head with upper and lower diaphragms having unalined ports therethrough, a chambered block between the diaphragms forming with the filling-head a measuring-chamber, a shaft connected with the chambered block, a gear loosely mounted on the shaft, a stirrer connected with the gear, means for operating the stirrer through the gear, and means for operating the chambered block through its shaft.

4. The combination with a weighing-mechanism, of a filling-head, a chambered block forming with the filling-head a measuring-chamber, diaphragms with unalined inlet and outlet ports for the measuring-chamber, a by-pass around the measuring-chamber, a conveyer located in the by-pass, means for rotating the chambered block so as to bring the measuring-chamber alternately into communication with the inlet and the outlet ports, means for operating the conveyer, and means controlled by the weighing-mechanism for stopping the conveyer.

5. The combination with a weighing-mechanism, of a bucket supported by the weighing-mechanism having a discharge-valve and a discharge-opening below the valve, a support for a can to receive the bucket-load, means for effecting hermetical connection between the discharge-opening of the bucket and the mouth of the can, and means for operating the discharge-valve.

6. The combination with a weighing-mechanism, of a bucket having a discharge-valve and a discharge-opening below the valve, a conveyer for cans provided with filling-tubes, means for hermetically connecting the mouths of the cans with the filling-tubes, means operative with the weighing-mechanism for bringing the filling-tubes in turn under the discharge-opening of the bucket, means for effecting hermetical connection between the discharge-opening of the bucket and the mouth of a filling-tube, and means for operating the discharge-valve.

7. The combination with a weighing-mechanism, of a chain conveyer for cans, a guide and support for the bottoms of the cans which diverges from the line of the conveyer beyond the loading point, and means operative with the weighing-mechanism for operating the chain conveyer to bring the filling-tubes in turn into position to receive the discharge from the weighing-mechanism and to remove the loaded cans, whereby the filling-tubes are withdrawn from each can during the operation of filling several cans.

8. The combination with a weighing-mechanism, of a conveyer for cans consisting of perforated plate links with a filling-tube passing through the perforation of each link through which material is received from the weighing mechanism.

9. The combination with a weighing-mechanism, of a filling-head, a power-driven conveyer for discharging material into the weighing-mechanism, a clutch in the power-transmission to the conveyer, power-driven means for operating the clutch, an automatically closing clutch in the power-driven means for operating the conveyer-clutch, a finger for holding the last named clutch in open position, a trigger controlled by the weighing-mechanism for holding the finger in engaging position, and means for resetting all the parts after operation.

10. The combination with a weighing-mechanism including a bucket, of a filling-head, a power-driven drip-stream conveyer for conveying material from the filling-head into the bucket, a clutch in its power transmission, power-driven means for discharging a measured volume of material from the filling-head into the bucket and closing the clutch in the power transmission to the drip-stream conveyer, a self-opening clutch in the power transmission for discharging a measured volume of material, power-driven means for opening the clutch in the power transmission of the drip-stream conveyer and effecting the closure of the clutch in the power transmission for discharging a measured volume of material, a self-opening clutch in the last-named power-driven means, and a trigger controlled by the weighing-mechanism for holding the last-named clutch and movable to release the same.

Signed at New York, N. Y., this 23rd day of September 1907.

DENIS A. FLAVELL.

Witnesses:
SAMUEL W. BALCH,
HUGH H. SENIOR.